United States Patent
Kim

(10) Patent No.: US 11,170,775 B2
(45) Date of Patent: Nov. 9, 2021

(54) DISPLAY APPARATUS AND METHOD FOR OPERATING DISPLAY APPARATUS

(71) Applicant: LG ELECTRONICS INC., Seoul (KR)

(72) Inventor: Yi Reun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 154 days.

(21) Appl. No.: 16/541,993

(22) Filed: Aug. 15, 2019

(65) Prior Publication Data

US 2019/0371333 A1    Dec. 5, 2019

(30) Foreign Application Priority Data

Jul. 15, 2019  (KR) .......................... 10-2019-0085395

(51) Int. Cl.
*G10L 15/22*    (2006.01)
*G10L 15/26*    (2006.01)
(Continued)

(52) U.S. Cl.
CPC .............. *G10L 15/22* (2013.01); *G10L 15/26* (2013.01); *G10L 15/285* (2013.01); *G06F 3/017* (2013.01);
(Continued)

(58) Field of Classification Search
CPC ....... G10L 15/26; G10L 15/22; G10L 15/065; H04N 21/4722; H04N 21/47214; G06F 3/017
See application file for complete search history.

(56) References Cited

U.S. PATENT DOCUMENTS 9,207,771 B2 * 12/2015 Antoniac ............ G06K 9/00389
2003/0061039 A1 * 3/2003 Levin ..................... G10L 15/26
704/246
(Continued)

FOREIGN PATENT DOCUMENTS

KR    10-2012-0008994 A    2/2012
KR    10-2014-0073996 A    6/2014

*Primary Examiner* — Feng-Tzer Tzeng
(74) *Attorney, Agent, or Firm* — Birch, Stewart, Kolasch & Birch, LLP

(57) ABSTRACT

Disclosed are a display apparatus and a method for operating the display apparatus, the display apparatus being operated by executing an artificial intelligence (AI) algorithm and/or a machine learning algorithm in a 5G environment connected for Internet of Things. The method for operating the display apparatus includes the acts of receiving utterance information of a user who is watching the display apparatus, selecting an utterance intention corresponding to the user's utterance information according to a predefined rule, switching operation of the display apparatus on the basis of the selected utterance intention, collecting reaction information of the user corresponding to the switched operation of the display apparatus, and reconstructing the predefined rule by using the user's utterance information, the selected utterance intention, and the user's reaction information. Since the user's utterance intention corresponding to the user's utterance information is accurately reflected when the operation of the display apparatus is switched, user satisfaction in using the display apparatus can be improved.

18 Claims, 6 Drawing Sheets

(51) Int. Cl.
*G10L 15/28* (2013.01)
*G10L 15/065* (2013.01)
*G06F 3/01* (2006.01)
*H04N 21/472* (2011.01)
*H04N 21/4722* (2011.01)

(52) U.S. Cl.
CPC ...... *G10L 15/065* (2013.01); *G10L 2015/223* (2013.01); *H04N 21/4722* (2013.01); *H04N 21/47214* (2013.01)

(56) References Cited

U.S. PATENT DOCUMENTS

| | | | |
|---|---|---|---|
| 2006/0075429 A1* | 4/2006 | Istvan | H04N 21/42204 |
| | | | 725/39 |
| 2006/0178886 A1* | 8/2006 | Braho | G10L 15/065 |
| | | | 704/246 |
| 2009/0262205 A1* | 10/2009 | Smith | H04N 7/181 |
| | | | 348/211.4 |
| 2013/0024195 A1* | 1/2013 | White | G10L 15/26 |
| | | | 704/235 |
| 2017/0230709 A1* | 8/2017 | Van Os | H04N 21/4122 |

* cited by examiner

| USER ID | UTTERANCE ID | UTTERANCE INFORMATION OF INDIVIDUAL USER | RESULT OF INTENTION ANALYSIS | NUMBER OF USER REACTIONS | | |
|---|---|---|---|---|---|---|
| | | | UTTERANCE INTENTION | POSITIVE | NEUTRAL | NEGATIVE |
| 1 | 1 | MBC DRAMA | CHANGE_CHANNEL | 15 | 25 | 3 |
| | | | SEARCH_CONTENT | 0 | 0 | 0 |
| | 2 | ACTION | …… | … | … | … |
| 2 | 1 | KBS | CHANGE_CHANNEL | 0 | 10 | 30 |
| | | | SEARCH_CONTENT | 20 | 30 | 0 |

(b)

| COMMON UTTERANCE ID | COMMON UTTERANCE INFORMATION OF USERS | RESULT OF INTENTION ANALYSIS | NUMBER OF USER REACTIONS | | |
|---|---|---|---|---|---|
| | | UTTERANCE INTENTION | POSITIVE | NEUTRAL | NEGATIVE |
| 1 | SBS DRAMA | CHANGE_CHANNEL | 1 | 15 | 37 |
| | | SEARCH_CONTENT | 30 | 50 | 2 |
| 2 | | …… | … | … | … |

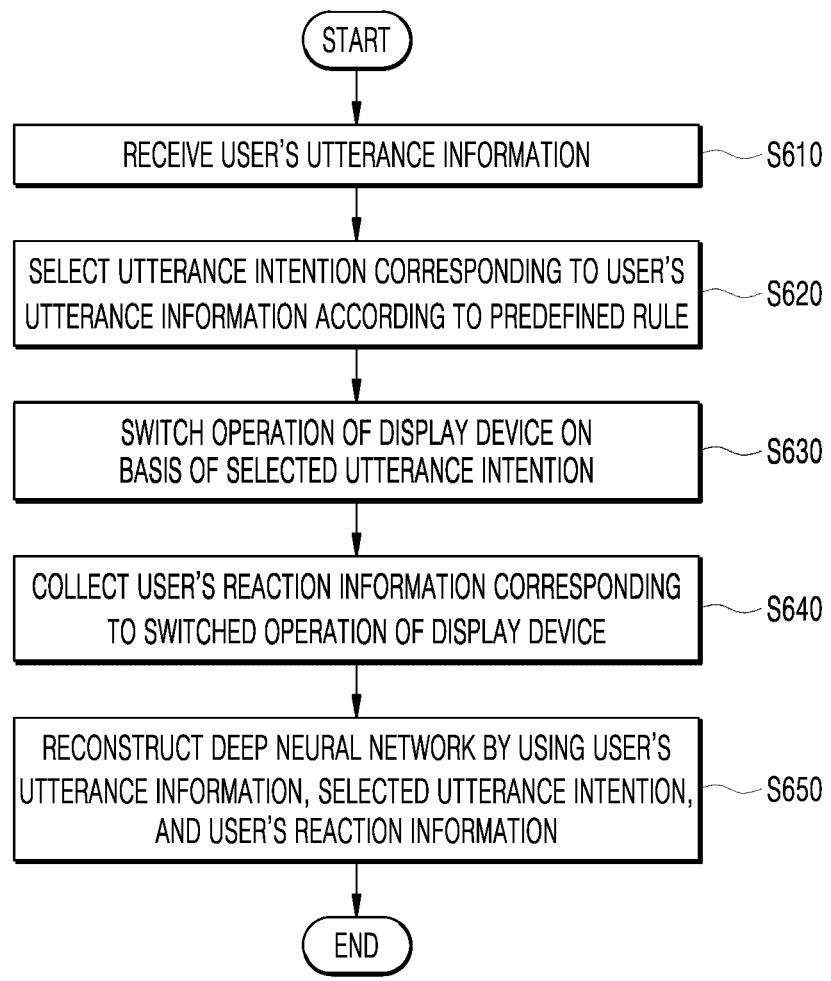
[FIG. 6]

DISPLAY APPARATUS AND METHOD FOR OPERATING DISPLAY APPARATUS

CROSS-REFERENCE TO RELATED APPLICATION

This present application claims benefit of priority to Korean Patent Application No. 10-2019-0085395, entitled "DISPLAY APPARATUS AND METHOD FOR OPERATIONAL DISPLAY APPARATUS" and filed on Jul. 15, 2019, in the Korean Intellectual Property Office, the entire disclosure of which is incorporated herein by reference.

BACKGROUND

1. Technical Field

The present disclosure relates to a display apparatus and a method for operational display apparatus. More particularly, the present disclosure relates to a display apparatus which establishes a database by collecting information of a user's reaction to the operation of the display apparatus corresponding to the user's utterance information, and selects an utterance intention that corresponds to the user's utterance information from the database to thereby operate the display apparatus, and a method for operating the display apparatus.

2. Description of Related Art

Related Art Documents

Related Art 1: Korean Patent Application Publication No. 10-2012-0008994 (published on Feb. 1, 2012)
Related Art 2: Korean Patent Application Publication No. 10-2014-0073996 (published on Jun. 17, 2014)

A display apparatus is a device having a function of displaying video that can be watched by a user, and the user can watch broadcasts through the display apparatus. The display apparatus displays, on a display thereof, a broadcast that is selected by the user from among broadcast signals transmitted from broadcast stations. Display apparatuss of recent years are equipped with a voice recognition device, such that users are able to control the display apparatuss simply by uttering voice, without having to use a remote control.

Related art 1 discloses a television equipped with a voice recognition device capable of easily recognizing a voice command even when a plurality of users individually input a voice command signal.

Related art 2 discloses an intelligent TV control method using voice, characterized in that a menu or content desired by a user can be conveniently and automatically navigated through a voice command, without the user having to spend time continuously pressing directional keys of a remote control.

However, there are some cases in which the same utterance is made even though each user wants different operations of the display apparatus. That is, even though utterances of users are the same, each of the utterances requires different display apparatus controls. For example, user A may utter "MBC drama" with an intent to change the channel of the display apparatus to an MBC drama channel, user B may utter "MBC drama" intending to retrieve a drama genre from among MBC programs, and user C may utter "MBC drama" with an intention of searching YouTube for MBC dramas.

In such cases, it may be impossible for the display apparatus to accurately reflect the intention of each of the users A, B, and C. That is, the display apparatus does not support a user-personalized operation. Even if such an operation is supported, the display apparatus will be operated as intended by the user only after several selection processes have been performed, which is inconvenient for users.

The background art described above is technical information that was retained by the inventor in order to select the present disclosure or was acquired by the inventor in the process of deriving the present disclosure. Therefore, the background art described above is not necessarily a known technology opened to the general public before the filing of the present application.

SUMMARY OF THE INVENTION

An aspect of the present disclosure is directed to resolving the deficiency associated with some related art discussed above in which a display apparatus does not support a user-personalized operation that accurately reflects a user's utterance intention corresponding to the user's utterance information.

Another aspect of the present disclosure is directed to addressing the inconvenience associated with some related art discussed above in which a user of a display apparatus is required to go through several selection processes for the user's utterance intention corresponding to the user's utterance information to be accurately reflected when the display apparatus is operated.

Another aspect of the present disclosure is directed to providing a display apparatus which, after receiving a user's utterance information and performing an operation, collects the user's reaction information, and by doing so, automatically detects whether the user's utterance intention has been accurately reflected when the display apparatus performs the operation.

Another aspect of the present disclosure is directed to providing a personalized display apparatus which establishes a database from a user's reaction information corresponding to the user's utterance information, and selects an utterance intention that corresponds to the user's utterance information from the database to thereby operate the display apparatus.

Another aspect of the present disclosure is directed to addressing the deficiency associated with some related art described above in which a display apparatus does not support a user-personalized operation that accurately reflects intentions of each user, while using optimal processing resources.

Another aspect of the present disclosure is directed to addressing the inconvenience associated with some related art described above in which users of a display apparatus are required go through several selection processes for the intentions of each user to be accurately reflected when the display apparatus is operated, while using optimal processing resources.

A method for operating a display apparatus according to an exemplary embodiment of the present disclosure may include establishing a database by collecting information of a user's reaction to the operation of the display apparatus corresponding to the user's utterance information, selecting an utterance intention corresponding to the user's utterance information from the database, and thereby operating the display apparatus.

Specifically, a method for operating a display apparatus according to an exemplary embodiment of the present disclosure may include the acts of receiving utterance information of a user who is watching the display apparatus, selecting an utterance intention that corresponds to the user's utterance information according to a predefined rule, switching operation of the display apparatus on the basis of the selected utterance intention, collecting reaction information of the user that corresponds to the switched operation of the display apparatus, and reconstructing the predefined rule by using the user's utterance information, the selected utterance intention, and the user's reaction information.

Through the method for operating a display apparatus according to this embodiment, the user's utterance intention corresponding to the user's utterance information can be accurately reflected when the operation of the display apparatus is switched, which can improve user satisfaction in using the display apparatus. In addition, since the user's utterance intention corresponding to the user's utterance information is accurately reflected when the display apparatus is operated, it is unnecessary for the user to go through several selection processes in order to operate the display apparatus, which can improve user satisfaction in using the display apparatus.

Further, the act of selecting an utterance intention that corresponds to the user's utterance information according to a predefined rule may include: retrieving whether a personalized statistical information database for the user has been established; when a personalized statistical information database for the user has been established, retrieving, from the personalized statistical information database, past reaction information of the user corresponding to at least one utterance intention that was selected corresponding to the user's utterance information, and selecting an utterance intention that has the highest proportion of positive reactions to negative reactions in the past reaction information; and when the user's past reaction information corresponding to at least one utterance intention that was selected corresponding to the user's utterance information is not retrieved from the personalized statistical information database, retrieving, from a common statistical information database for the user and other users, past reaction information of the other users corresponding to at least one utterance intention that was selected corresponding to the user's utterance information, and selecting an utterance intention that has the highest proportion of positive reactions to negative reactions in the past reaction information of the other users.

Furthermore, the act of selecting an utterance intention that corresponds to the user's utterance information according to a predefined rule may further include: when the other users' past reaction information corresponding to at least one utterance intention that was selected corresponding to the user's utterance information is not retrieved from the common statistical information database, selecting an utterance intention having the highest probability from among a predetermined number of utterance intentions of which probabilities have been calculated, by using a deep neural network which is pre-trained to calculate probabilities of a predetermined number of utterance intentions that correspond to utterance information.

Furthermore, the act of reconstructing may include reconstructing the deep neural network such that as the number of negative reactions to the utterance intention selected corresponding to the user's utterance information increases, the probability that the utterance intention is selected for the utterance information decreases, and as the number of positive reactions to the utterance intention selected corresponding to the user's utterance information increases, the probability that the utterance intention is selected for the utterance information increases.

Furthermore, the act of collecting reaction information of the user may include collecting the user's reaction information from image information of the user which is obtained by using a camera within a predetermined time after the operation of the display apparatus is switched on the basis of the selected utterance intention.

Furthermore, the act of collecting reaction information of the user may include collecting the user's reaction information from audio information of the user which is obtained by using a microphone within a predetermined time after the operation of the display apparatus is switched on the basis of the selected utterance intention.

Furthermore, the method for operating a display apparatus according to this embodiment may further include, after the act of receiving utterance information of a user, converting the utterance information to text.

Furthermore, the method for operating a display apparatus according to this embodiment may further include, before the act of switching the operation of the display apparatus on the basis of the selected utterance intention, generating and providing notification information notifying the user that the operation of the display apparatus will be switched on the basis of the selected utterance intention.

A display apparatus according to an exemplary embodiment of the present disclosure may include a reception unit configured to receive utterance information of a user who is watching the display apparatus, an analysis unit configured to select an utterance intention that corresponds to the user's utterance information according to a predefined rule, a switch unit configured to switch operation of the display apparatus on the basis of the selected utterance intention, a collection unit configured to collect reaction information of the user that corresponds to the switched operation of the display apparatus, and a reconstruction unit configured to reconstruct the predefined rule by using the user's utterance information, the selected utterance intention, and the user's reaction information.

Through the display apparatus according to this embodiment, the user's utterance intention corresponding to the user's utterance information can be accurately reflected when the operation of the display apparatus is switched, which can improve user satisfaction in using the display apparatus. In addition, since the user's utterance intention corresponding to the user's utterance information is accurately reflected when the display apparatus is operated, it is unnecessary for the user to go through several selection processes in order to operate the display apparatus, which can improve user satisfaction in using the display apparatus.

Further, the analysis unit may retrieve whether a personalized statistical information database for the user has been established, and when a personalized statistical information database for the user has been established, the analysis unit may retrieve, from the personalized statistical information database, past reaction information of the user corresponding to at least one utterance intention that was selected corresponding to the user's utterance information, and select an utterance intention that has the highest proportion of positive reactions to negative reactions in the past reaction information. When the user's past reaction information corresponding to at least one utterance intention that was selected corresponding to the user's utterance information is not retrieved from the personalized statistical information database, the analysis unit may retrieve, from a common statistical information database for the user and other users, past reaction information of the other users corresponding to at least one utterance intention that was selected corresponding to the user's utterance information, and select an utterance intention that has the highest proportion of positive reactions to negative reactions in the past reaction information of the other users.

Furthermore, when the other users' past reaction information corresponding to at least one utterance intention that was selected corresponding to the user's utterance information is not retrieved from the common statistical information database, the analysis unit may select an utterance intention having the highest probability from among a predetermined number of utterance intentions of which probabilities have been calculated, by using a deep neural network which is pre-trained to calculate probabilities of a predetermined number of utterance intentions that correspond to utterance information.

Furthermore, the reconstruction unit may reconstruct the deep neural network such that as the number of negative reactions to the utterance intention selected corresponding to the user's utterance information increases, the probability that the utterance intention is selected for the utterance information decreases, and as the number of positive reactions to the utterance intention selected corresponding to the user's utterance information increases, the probability that the utterance intention is selected for the utterance information increases.

Furthermore, the collection unit may collect the user's reaction information from image information of the user which is obtained by using a camera within a predetermined time after the operation of the display apparatus is switched on the basis of the selected utterance intention.

Furthermore, the collection unit may collect the user's reaction information from audio information of the user which is obtained by using a microphone within a predetermined time after the operation of the display apparatus is switched on the basis of the selected utterance intention.

Furthermore, the display apparatus according to this embodiment may further include a pretreatment unit which, after the user's utterance information is received, may convert the user's utterance information to text.

Furthermore, before the operation of the display apparatus is switched on the basis of the selected utterance intention, the switch unit may generate and provide notification information notifying the user that the operation of the display apparatus will be switched on the basis of the selected utterance intention.

In addition to these, there may be further provided another method for implementing the present disclosure, another system, and a computer-readable recording medium in which a computer program configured to execute the method is stored.

Other aspects, features, and advantages of the present disclosure, aside from those mentioned above, will be more apparent with reference to the following drawings, claims, and detailed description of the present disclosure.

According to an exemplary embodiment of the present disclosure, it is possible to produce an effect of a user-personalized display apparatus, by collecting information of a user's reaction to the operation of the display apparatus corresponding to the user's utterance information, establishing a database, selecting, from the database, an utterance intention that corresponds to the user's utterance information, and thereby operating the display apparatus.

Further, when a user-personalized display apparatus is applied, the display apparatus, after receiving the user's utterance information, may switch the operation thereof on the basis of the selected utterance intention. Accordingly, the display apparatus does not need to make a further question requesting the user for a selection, and thus the user can easily and conveniently use the display apparatus.

Furthermore, the user's utterance intention corresponding to the user's utterance information may be accurately reflected when the operation of the display apparatus is switched, thereby improving user satisfaction in using the display apparatus.

Furthermore, since the user's utterance intention corresponding to the user's utterance information is accurately reflected when the display apparatus is operated, it may be unnecessary for the user to go through several selection processes in order to operate the display apparatus. Accordingly, user satisfaction in using the display apparatus may be improved.

Furthermore, even if information accumulated in the personalized statistical information database and the common statistical information database is insufficient, an utterance intention may be selected according to the predefined rule, and even if information accumulated in the personalized statistical information database is insufficient, an utterance intention that is generally wanted by users may be selected by using the common statistical information database. Accordingly, since the utterance intention is accurately reflected when the display apparatus is switched user satisfaction in using the display apparatus may be improved.

The advantageous effects of the present disclosure is not limited to those described above, and other effects of the present disclosure that are not mentioned above will be clearly understood by those skilled in the art from the following description.

BRIEF DESCRIPTION OF THE DRAWINGS

The above and other aspects, features, and advantages of the present disclosure will become apparent from the detailed description of the following aspects in conjunction with the accompanying drawings, in which:

FIG. 4 is an exemplary view for explaining information established in the database of FIG. 3;

FIG. 6 is a flow chart illustrating a method for operating a display apparatus according to an exemplary embodiment of the present disclosure.

DETAILED DESCRIPTION

Figure 1:
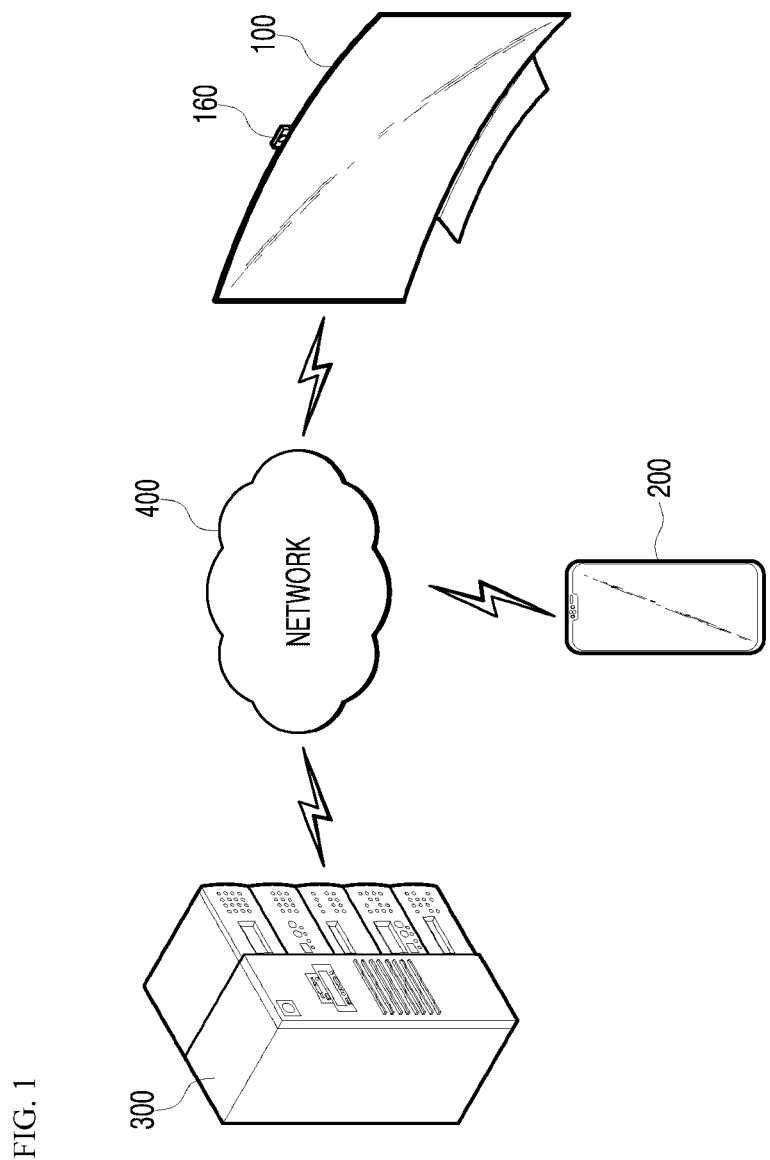
FIG. 1 is an exemplary view illustrating a display apparatus control environment including a display apparatus, a user terminal, a server, and a network connecting the display apparatus, the user terminal, and the server, according to an exemplary embodiment of the present disclosure.

Advantages and features of the present disclosure and methods of achieving the advantages and features will be more apparent with reference to the following detailed description of example embodiments in connection with the accompanying drawings. However, the description of particular example embodiments is not intended to limit the present disclosure to the particular example embodiments disclosed herein, but on the contrary, it should be understood that the present disclosure is to cover all modifications, equivalents and alternatives falling within the spirit and scope of the present disclosure. The example embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Furthermore, the terms such as "first," "second," and other numerical terms may be used herein only to describe various elements, but these elements should not be limited by these terms. Furthermore, these terms such as "first," "second," and other numerical terms, are used only to distinguish one element from another element.

As used herein, the term "and/or" includes any and all combinations of one or more of the associated listed items. The terms "connected" and "coupled" are not restricted to physical or mechanical connections or couplings, and can include electrical connections or couplings, whether direct or indirect. The connection can be such that the objects are permanently connected or releasably connected.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

Hereinbelow, the example embodiments of the present disclosure will be described in greater detail with reference to the accompanying drawings, and on all these accompanying drawings, the identical or analogous elements are designated by the same reference numeral, and repeated description of the common elements will be omitted. It should be understood that the embodiments are illustrative, and should not be construed as being limiting in any way.

FIG. 1 is an exemplary view illustrating a display apparatus control environment including a display apparatus, a user terminal, a server, and a network connecting the display apparatus, the user terminal, and the server, according to an exemplary embodiment of the present disclosure. Referring to FIG. 1, a display apparatus control environment may include a display apparatus 100, a user terminal 200, a server 300, and a network 400. The display apparatus 100, the user terminal 200, and the server 300 may be connected to one another in a 5G communication environment. Further, in addition to the devices illustrated in FIG. 1, various other electronic devices used at home or office may be connected to one another and operated in an Internet of things (IoT) environment.

The display apparatus 100 may include, for example, a device having a function of receiving and processing a broadcast video which can be watched by a user. The display apparatus 100 may, for example, display a broadcast that is selected by a user from among broadcast signals transmitted from broadcast stations on a display unit (140 in FIG. 2). In recent years, broadcasting has been changing from analog broadcasting to digital broadcasting all around the world. Digital broadcasting may mean a broadcasting that transmits digital video and audio signals. Compared with analog broadcasting, digital broadcasting may be stronger against external noise, causing small amount of data loss, may be advantageous for error correction, and may provide a high resolution and clear display. In addition, unlike analog broadcasting, digital broadcasting is capable of providing a bidirectional service. Recently, in order to use digital broadcasting including various content, the display apparatus 100 has been improved in performance and diversified in function. Further, through improved performance of the display apparatus 100, a user of the display apparatus 100 may not only receive video signals from broadcast stations and watches broadcasts, but may also play games, listen to music, and do Internet shopping, by using a variety of applications of the display apparatus 100.

In this embodiment, the display apparatus 100 may be, for example, an intelligent display apparatus having a computer supporting function in addition to a broadcast receiving function. The intelligent display apparatus, while being dedicated to the broadcast receiving function, may further have an Internet function and may be equipped with a convenient interface such as a handwriting input device, a touch screen, or a space remote control. Further, the display apparatus 100 may be connected to the Internet and a computer by means of a wired or wireless Internet function, to perform a function for e-mail, web browsing, banking, or games. For such various functions, a standardized general-purpose OS may be used. The display apparatus 100 may perform various user-friendly functions, since various applications on, for example, a general-purpose OS kernel, may be freely added or deleted. The display apparatus 100 may include, for example, a network TV, an HBBTV, and a smart TV. In some cases, the display apparatus 100 may be applied to a user terminal 200.

In this embodiment, the display apparatus 100 may receive utterance information of a user who is watching the display apparatus 100 and select an utterance intention that corresponds to the user's utterance information according to a predefined rule. The display apparatus 100 may switch the operation of the display apparatus 100 on the basis of the selected utterance intention, collect reaction information of the user that corresponds to the switched operation of the display apparatus 100, and reconstruct the predefined rule by using the user's utterance information, the selected utterance intention, and the user's reaction information.

Here, the user's utterance information may be a voice command that is uttered by the user following a wake-up word, and the display apparatus 100, after obtaining the user's utterance information, may perform an operation that corresponds to the user's utterance information through voice recognition. For example, when the user's utterance information is "MBC drama," the display apparatus 100 may switch the current display to a display that has completed a search for MBC drama. Here, the display apparatus 100 may analyze the user's utterance information and select an utterance intention that corresponds to the user's utterance information, and depending on the selected utterance intention, the display that has completed a search for MBC drama may have different results. For example, the display that has completed a search for MBC drama according to the selected utterance intention may be displaying an MBC drama channel, or may be a display retrieving a drama genre from among MBC programs, or may be a display searching YouTube for MBC dramas. The wake-up word may be a specific voice command that activates a voice recognition function of the display apparatus 100. For example, the wake-up word may be "Hi LG." The voice recognition function may be activated only when the voice uttered by the user includes the wake-up word, and when the wake-up word is not included in the voice, the voice recognition function may remain in an inactive state (for example, a sleep mode). Such a wake-up word may be preset and stored in a storage unit (180 in FIG. 2), which will be discussed below.

Further, the user's reaction information may include information of a user's reaction to a display switched on the basis of the selected utterance intention. The user's reaction information may be a voice or a gesture expressed by the user. The user's voice may be collected by using an audio input unit (151 in FIG. 2), and the user's gesture may be collected by using a camera provided in a sensing unit (160 in FIG. 2). Further, the user's reaction information may include positive reaction information, negative reaction information, and neutral reaction information. The positive reaction information is a voice and/or a gesture expressed by the user when the operation of the display apparatus 100 switched on the basis of the selected utterance intention is satisfactory, the negative reaction information is a voice and/or a gesture expressed by the user when the operation of the display apparatus 100 switched on the basis of the selected utterance intention is unsatisfactory, and the neutral reaction information is information generated when the user does not express a voice or gesture when the operation of the display apparatus 100 switched on the basis of the selected utterance intention is neither satisfactory nor unsatisfactory.

The user terminal 200 may monitor state information of the display apparatus 100 through an authentication process after accessing a display apparatus operation application or a display apparatus operation site, or may be provided with a service that can operate or control the display apparatus 100. In this embodiment, when the user terminal 200 receives a voice command of the user after finishing the authentication process, for example, the user terminal 200 may control the operation of the display apparatus 100, including controlling volume or switching channels.

In this embodiment, the user terminal 200 may include a communication terminal capable of performing functions of a computing device (not illustrated), and may include, but is not limited to, a user-operable desktop computer, a smartphone, a notebook computer, a tablet PC, a smart TV, a mobile phone, a personal digital assistant (PDA), a laptop computer, a media player, a micro server, a global positioning system (GPS) device, an E-book reader, a digital broadcasting terminal, a navigation system, a kiosk information system, an MP3 player, a digital camera, a home appliance, and any other mobile or immobile computing devices. Also, the user terminal 200 may be a wearable terminal implemented with communication function and data processing function, such as a wearable watch, wearable glasses or goggles, a wearable hairband, a wearable ring, and the like. The user terminal 200 is not limited to the aforementioned items, but may be any terminal capable of web-browsing.

The server 300 may be a database server providing big data required for the application of various artificial intelligence algorithms and data configured to operate the display apparatus 100. Further, the server 300 may include a web server or an application server which enables remote control of the operation of the display apparatus 100 by using a display apparatus operation application or a display apparatus operation web browser installed in the user terminal 200.

Artificial intelligence (AI) is an area of computer engineering and information technology that studies how to make computers perform things that humans are capable of doing with human intelligence, such as reasoning, learning, self-improving, and the like.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed. More specifically, machine learning is a technology that investigates and builds systems, and algorithms for such systems, which are capable of learning, making predictions, and enhancing their own performance on the basis of experiential data. Machine learning algorithms, rather than executing rigidly-set static program commands, may take an approach that builds a specific model based on input data for deriving a prediction or decision.

The server 300 may transmit and receive signals to and from the display apparatus 100 and/or the user terminal 200. When the server 300 receives the user's utterance information from the display apparatus 100, the server 300 may analyze the user's utterance information and select an utterance intention that corresponds to the user's utterance information according to a predefined rule. The server 300 may transmit the selected utterance intention to the display apparatus 100 and control the display apparatus 100 such that the display apparatus 100 switches the operation thereof on the basis of the selected utterance intention. The server 300 may receive the user's reaction information that corresponds to the switched operation from the display apparatus 100 and reconstruct the predefined rule by using the user's utterance information, the selected utterance intention, and the user's reaction information.

The network 400 may perform the role of connecting the display apparatus 100, the user terminal 200, and the server 300. The network 400 may include a wired network such as a local area network (LAN), a wide area network (WAN), a metropolitan area network (MAN), or an integrated service digital network (ISDN), and a wireless network such as a wireless LAN, a CDMA, Bluetooth®, or satellite communication, but the present disclosure is not limited to these examples. The network 400 may also send and receive information using short distance communication and/or long distance communication. The short distance communication may include Bluetooth®, radio frequency identification (RFID), infrared data association (IrDA), ultra-wideband (UWB), ZigBee, and Wi-Fi (wireless fidelity) technologies, and the long distance communication may include code division multiple access (CDMA), frequency division multiple access (FDMA), time division multiple access (TDMA), orthogonal frequency division multiple access (OFDMA), and single carrier frequency division multiple access (SC-FDMA).

The network 400 may include connection of network elements such as hubs, bridges, routers, switches, and gateways. The network 400 may include one or more connected networks, including a public network such as the Internet and a private network such as a secure corporate private network. For example, the network may include a multi-network environment. Access to the network 400 may be provided via one or more wired or wireless access networks. Further, the network 400 may support 5G communication and/or an Internet of things (IoT) network for exchanging and processing information between distributed components such as objects.

Figure 2:
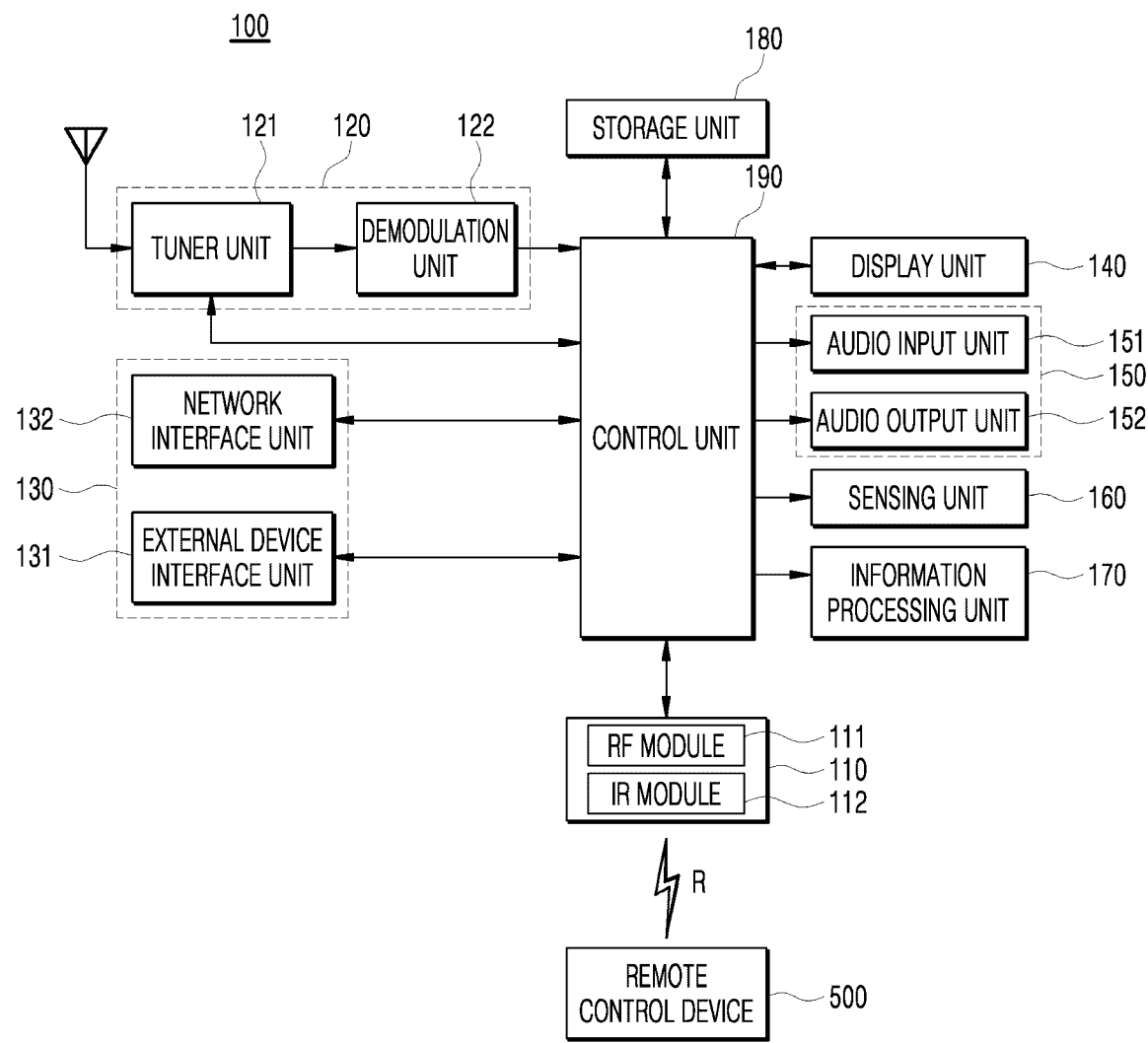
FIG. 2 is a schematic block diagram illustrating a display apparatus according to an exemplary embodiment of the present disclosure.

FIG. 2 is a schematic block diagram illustrating a display apparatus according to an exemplary embodiment of the present disclosure. Hereinafter, the same description as that of FIG. 1 above will be omitted. Referring to FIG. 2, the display apparatus 100 may include a signal reception unit 110, a broadcast reception unit 120, an interface unit 130, a display unit 140, an audio processing unit 150, a sensing unit 160, an information processing unit 170, a storage unit 180, and a control unit 190.

The signal reception unit 110 may transmit and receive a signal (R) to and from a remote control device 500. The signal reception unit 110 may receive a signal (R) from the remote control device 500 and transmit the received signal (R) to the control unit 190, and may receive a signal (R) from the control unit 190 and transmit the received signal (R) to the remote control device 500. The signal reception unit 110 may transmit and receive a user input signal for power on/off, channel selection, display setting, and the like to and from the remote control device 500. The control unit 190 may control the display apparatus 100 by means of a user command inputted through the signal reception unit 110 or by means of an internal program.

In this embodiment, the signal reception unit 110 may include a radio frequency (RF) module 111 and an infrared (IR) module 112. The signal reception unit 110 may wirelessly transmit and receive a signal to and from the remote control device 500 through the RF module 111. The RF module 111 of the display apparatus 100 may transmit and receive a signal (R) to and from an RF module (not illustrated) of the remote control device 500. Further, the signal reception unit 110 may receive, through the IR module 112, a signal transmitted by the remote control device 500 according to an IR communication standard. The IR module 112 of the display apparatus 100 may transmit and receive a signal (R) to and from an IR module (not illustrated) of the remote control device 500.

The broadcast reception unit 120 may include a tuner unit 121 and a demodulation unit 122. Furthermore, the broadcast reception unit 120 may include a network interface unit 132 of the interface unit 130. The broadcast reception unit 120 may be designed, as necessary, not to include the network interface unit 132, while including the tuner unit 121 and the demodulation unit 122. Conversely, the broadcast reception unit 120 may be designed not to include the tuner unit 121 and the demodulation unit 122, while including the network interface unit 132.

The tuner unit 121 may select, from among RF broadcast signals received through an antenna, a RF broadcast signal that corresponds to a channel selected by a user or all prestored channels. In addition, the tuner unit 121 may convert the selected RF broadcast signal to an intermediate frequency signal or a baseband video or audio signal. If the selected RF broadcast signal is a digital broadcast signal, for example, the tuner unit 121 may convert the selected RF broadcast signal to a digital IF signal (DIF). Further, if the selected RF broadcast signal is an analog broadcast signal, the tuner unit 121 may convert the selected RF broadcast signal to an analog baseband video or audio signal (a composite video baseband signal/sound intermediate frequency, or CVBS/SIF). That is, the tuner unit 121 may process a digital broadcast signal or an analog broadcast signal. The analog baseband video or audio signal (CVBS/SIF) outputted from the tuner unit 121 may be directly inputted into the control unit 190.

Further, the tuner unit 121 may receive an RF broadcast signal of a single carrier according to an advanced television system committee (ATSC) scheme or an RF broadcast signal of a plurality of carriers according to a digital video broadcasting (DVB) scheme. Meanwhile, in order to receive broadcast signals of a plurality of channels, the tuner unit 121 may be provided with a plurality of tuners, or may be composed of a single tuner that receives broadcast signals of a plurality of channels at once.

The demodulation unit 122 may receive a digital IF signal (DIF) that has been converted in the tuner unit 121, and perform a demodulation operation. The demodulation unit 122 may output a stream signal (transport stream, or TS) after performing a demodulation and a channel decoding. Here, the stream signal may be a multiplexed video signal, audio signal, or data signal. The stream signal outputted from the demodulation unit 122 may be inputted into the control unit 190. The control unit 190, after performing a demultiplexing and a video/audio signal processing, may output video to the display unit 140 and output audio to an audio output unit 152.

An external device interface unit 131 of the interface unit 130 may transmit or receive data to or from a connected external device (for example, the server 300 in FIG. 1). To this end, the external device interface unit 131 may include an A/V input/output unit (not illustrated) or a wireless communication unit (not illustrated). The external device interface unit 131, including the server 300 of FIG. 1, may be connected wirelessly or by wire to an external device, such as a digital versatile disk (DVD), a Blu-ray disc, a game device, a camera, a camcorder, a computer (a laptop computer), and a set-top box. The external device interface unit 131 may perform input/output operations with an external device. The A/V input/output unit may receive video and audio signals of an external device. Meanwhile, the wireless communication unit may perform short-range wireless communications with other electronic devices.

The network interface unit 132 of the interface unit 130 may provide an interface configured to connect the display apparatus 100 to a wired/wireless network including an Internet network. For example, the network interface unit 132 may receive, through a network, content or data provided by an Internet or content provider or a network operator.

The display unit 140 may convert a video signal, a data signal, an OSD signal, and a control signal that are processed in the control unit 190, or an image signal, a data signal, and a control signal that are received from the external device interface unit 131, and display the converted signal. The display unit 140 may include a plasma display panel (PDP), a liquid crystal display (LCD), a light emitting display (LED), an organic light emitting diode (OLED), and a flexible display, and a three-dimensional display (3D display) may be possible.

The display unit 140 may include a touch screen, and thus may be used as an input device as well as an output device. To this end, the display unit 140 may include a touch recognition display controller or other various input/output controllers. As an example, the touch recognition display controller may provide an output interface and an input interface between the display apparatus 100 and the user. The touch recognition display controller may transmit and receive an electrical signal to and from the control unit 190.

In addition, the touch recognition display controller may display a visual output for the user, and the visual output may include text, a graphic, an image, video, and combinations thereof.

An audio input unit 151 of the audio processing unit 150 may receive the user's utterance information, that is, a spoken utterance of the user, and transmit the utterance information to the control unit 190. The control unit 190 may then transmit the user's utterance information to the information processing unit 170 such that a voice recognition process is performed. In order to receive the user's utterance information, the audio input unit 151 may include at least one microphone (not illustrated). Further, in order to more accurately receive the user's utterance information, the audio input unit 151 may include a plurality of microphones (not illustrated). Here, each of the plurality of microphones may be disposed to be spaced apart from each other at different positions, and may process the user's utterance information into an electrical signal. In this embodiment, the audio input unit 151 may be used to collect the user's reaction information, including the user's voice.

In an alternate embodiment, the audio input unit 151 may use various noise removal algorithms in order to remove noise that is generated in the process of receiving the user's utterance information. In an alternate embodiment, the audio input unit 151 may include various elements configured to process an audio signal, such as a filter (not illustrated) configured to remove noise when the user's spoken utterance is received, and an amplifier (not illustrated) configured to amplify and output a signal outputted from the filter.

The audio output unit 152 of the audio processing unit 150 may, by control of the control unit 190, output an audio signal from among broadcast signals, or may output, in the form of audio, a notification message regarding an operation mode, an operation state, and an error state of the display apparatus 100, information on the result of a voice recognition process corresponding to the user's utterance information, and the control state of the display apparatus 100 inputted through the remote control device 500. The audio output unit 152 may convert an electrical signal coming from the control unit 190 into an audio signal and output the audio signal. To this end, the audio output unit 152 may include a speaker (not illustrated).

The sensing unit 160 may include an image sensor which senses the surroundings of the display apparatus 100. In this embodiment, the image sensor may be used to collect the reaction information, including the user's gesture. The image sensor may include a camera (not illustrated) which can capture the surroundings of the display apparatus 100, and a plurality of cameras may be installed for image-capturing efficiency. For example, the camera may include at least one optical lens, an image sensor (for example, a CMOS image sensor) including a plurality of photodiodes (for example, pixels) on which an image is focused by the light passing through the optical lens, and a digital signal processor (DSP) which configures an image on the basis of a signal outputted from the photodiodes. The digital signal processor may generate not only a static image but also a video formed of frames of static images. Meanwhile, a video that is captured and acquired by the camera as an image sensor may be stored in the storage unit 180.

In this embodiment, the sensing unit 160 is described as an image sensor, but the sensing unit 160 is not limited thereto. The sensing unit 160 may include at least one among sensors configured to sense the surroundings of the display apparatus 100 such as a Lidar sensor, a weight sensor, an illumination sensor, a touch sensor, an acceleration sensor, a magnetic sensor, a G-sensor, a gyroscope sensor, a motion sensor, an RGB sensor, an infrared sensor (IR sensor), a finger scan sensor, an ultrasonic sensor, an optical sensor, a microphone, a battery gauge, an environmental sensor (for example, a barometer, a hygrometer, a thermometer, a radiation sensor, a thermal sensor, and a gas sensor), and a chemical sensor (for example, an electronic nose, a healthcare sensor, and a biometrics sensor). Meanwhile, in this embodiment, the display apparatus 100 may combine information that is sensed by at least two sensors from among the aforementioned sensors and use the combined information.

The information processing unit 170 may receive utterance information of the user who is watching the display apparatus 100 and select an utterance intention that corresponds to the user's utterance information according to the predefined rule. The information processing unit 170 may switch the operation of the display apparatus 100 on the basis of the selected utterance intention, collect the user's reaction information that corresponds to the switched operation of the display apparatus 100, and reconstruct the predefined rule by using the user's utterance information, the selected utterance intention, and the user's reaction information.

In this embodiment, the information processing unit 170 may perform learning in conjunction with the control unit 190, or receive a learning result from the control unit 190. In this embodiment, the information processing unit 170 may be provided outside the control unit 190 as illustrated in FIG. 2, or may be provided within the control unit 190 to operate like the control unit 190, or may be provided within the server 300 of FIG. 1. Hereinafter, the details of the information processing unit 170 will be described with reference to FIG. 3.

The storage unit 180 may store therein various information required for the operation of the display apparatus 100, and may include a volatile or non-volatile recording medium. For example, the storage unit 180 may store therein a program configured to process and control each signal in the control unit 190, or may store therein a signal-processed video, audio, or data signal. In addition, the storage unit 180 may perform a function for temporarily storing a video, audio, or data signal that is inputted to the external device interface unit 131. Further, the storage unit 180 may store therein information related to a predetermined broadcast channel by using a channel memory function such as a channel map.

Further, the storage unit 180 may store therein a wake-up word which is preset for determining whether the user's spoken utterance includes a wake-up word. The wake-up word may be set by a manufacturer. For example, "Hi LG" may be set as a wake-up word, and a setting thereof may be changed by the user. Such a wake-up word may be inputted in order to activate the display apparatus 100. The display apparatus 100 that has recognized the wake-up word uttered by the user may switch to a voice recognition activation state.

In this embodiment, an example in which the storage unit 180 and the control unit 190 are separately provided is illustrated, but the scope of the present disclosure is not limited thereto. The storage unit 180 may be included within the control unit 190.

Here, the storage unit 180 may include a magnetic storage medium or a flash storage medium, but the scope of the present disclosure is not limited thereto. Such a storage unit 180 may include a built-in memory and/or an external memory, and may include a volatile memory such as a DRAM, an SRAM, or an SDRAM, a non-volatile memory such as a one-time programmable ROM (OTPROM), a PROM, an EPROM, an EEPROM, a mask ROM, a flash ROM, a NAND flash memory, or a NOR flash memory, a flash drive such as a solid state disk (SSD) compact flash (CF) card, an SD card, a Micro-SD card, a Mini-SD card, an Xd card, or a memory stick, or a storage device such as a HDD.

Here, relatively simple voice recognition may be performed by the information processing unit 170 and/or the control unit 190, and relatively complex voice recognition such as natural language processing may be performed by the server 300. For example, when a word uttered by the user is a preset wake-up word, the display apparatus 100 may switch to a state for receiving an utterance of the user as a voice command. Here, the display apparatus 100 may perform a voice recognition process, up to a stage where it is determined whether the wake-up word has been inputted in the form of voice. After that, the rest of the voice recognition process for the utterance information may be performed by the server 300. Since system resources of the display apparatus 100 may be limited, natural language recognition and processing, which are relatively complex, may be performed by the server 300.

The control unit 190, as a central processing unit, may operate control software installed in the storage unit 180 to control the entire operation of the display apparatus 100. The control unit 190 may control the display apparatus 100 by means of a user command that is inputted through the signal reception unit 110, the user's utterance information that is inputted through the audio input unit 151, or an internal program stored in the storage unit 180. In addition, the control unit 190 may control the display unit 140 such that the display unit 140 displays a video. Here, the video displayed on the display unit 140 may be a still image or a moving image, and may be a 3D video.

In this embodiment, the control unit 190 may include all kinds of devices that can process data, such as a processor. Here, the 'processor' may refer to a data processing device built in a hardware, which includes physically structured circuits in order to perform functions represented as a code or command present in a program. Examples of the data processing device built in a hardware include, but are not limited to, processing devices such as a microprocessor, a central processing unit (CPU), a processor core, a multiprocessor, an application-specific integrated circuit (ASIC), a field programmable gate array (FPGA), and the like.

In this embodiment, the information processing unit 170 and/or the control unit 190 may perform machine learning, such as a deep learning, in order to derive an optimal utterance intention by analyzing the user's spoken utterance, and switch the operation of the display apparatus 100 on the basis of the optimal utterance intention. The storage unit 180 may store therein data used for the machine learning, result data, and the like.

Deep learning, which is a subfield of machine learning, enables data-based learning through multiple layers. As the number of layers in deep learning increases, the deep learning network may acquire a collection of machine learning algorithms that extract core data from multiple datasets.

Deep learning structures may include an artificial neural network (ANN), and may include a convolutional neural network (CNN), a recurrent neural network (RNN), a deep belief network (DBN), and the like. The deep learning structure according to the present embodiment may use various structures well known in the art. For example, the deep learning structure according to the present disclosure may include a CNN, an RNN, a DBN, and the like. RNN is an artificial neural network structure which is formed by building up layers at each instance, and which is heavily used in natural language processing and the like and effective for processing time-series data which vary over a course of time. A DBN includes a deep learning structure formed by stacking up multiple layers of a deep learning scheme, restricted Boltzmann machines (RBM). A DBN has the number of layers formed by repeating RBM training. A CNN includes a model mimicking a human brain function, built under the assumption that when a person recognizes an object, the brain extracts the most basic features of the object and recognizes the object based on the results of complex processing in the brain.

Meanwhile, the artificial neural network can be trained by adjusting connection weights between nodes (if necessary, adjusting bias values as well) so as to produce desired output from given input. Also, the artificial neural network can continuously update the weight values through learning. Furthermore, methods such as back propagation may be used in training the artificial neural network.

Meanwhile, the information processing unit 170 and/or the control unit 190 may be provided with an artificial neural network and perform machine learning-based user recognition and user's voice recognition using received audio input signals as input data.

The information processing unit 170 and/or the control unit 190 may include a deep neural network (DNN) and train the DNN, and examples of the DNN include CNN, RNN, DBN, and so forth. As a machine learning method for such an artificial neural network, both unsupervised learning and supervised learning may be used. The control unit 190 may be controlled so as to learn according to a setting and update a structure of the artificial neural network.

In this embodiment, the external device interface unit 131, the audio input unit 151, the audio output unit 152, the information processing unit 170, the storage unit 180, and the control unit 190 may be included in a voice recognition module (not illustrated).

In this embodiment, the voice recognition module may include the external device interface unit 131 configured to transmit an operation signal that corresponds to the voice command included in the user's utterance information and/or various information to the user terminal 200 and/or the server 300, the audio input unit 151 configured to receive the user's utterance information, the audio output unit 152 configured to output a result of a voice recognition processing in the form of audio, and the control unit 190 (or the information processing unit 170) configured to analyze the voice command by using a voice recognition algorithm and generate a result of the voice recognition processing.

Figure 3:
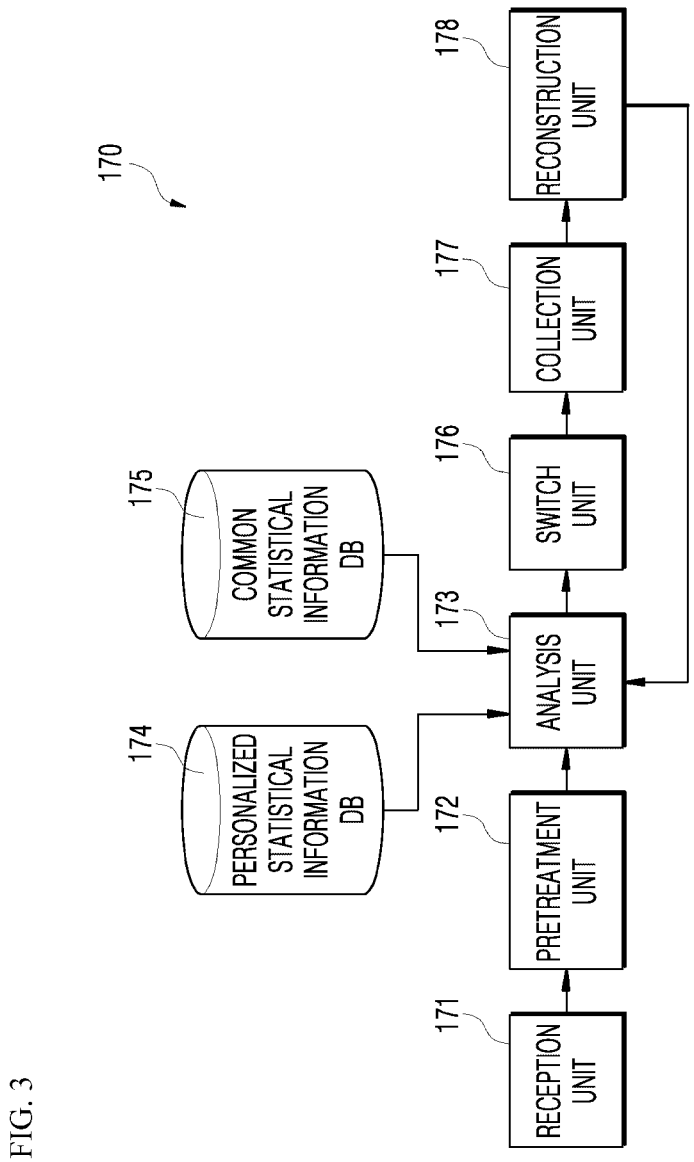
FIG. 3 is a schematic block diagram illustrating an information processing unit of FIG. 2.

FIG. 3 is a schematic block diagram illustrating the information processing unit of FIG. 2. Hereinafter, the same description as that of FIG. 1 and FIG. 2 above will be omitted. Referring to FIG. 3, the information processing unit 170 may include a reception unit 171, a pretreatment unit 172, an analysis unit 173, a personalized statistical information database (DB) 174, a common statistical information DB 175, a switch unit 176, a collection unit 177, and a reconstruction unit 178.

The reception unit 171 may receive utterance information of the user who is watching the display apparatus 100. The user's utterance information may be transmitted to the reception unit 171 through the audio input unit 151 under control of the control unit 190. For example, the user's utterance information may be "MBC drama."

The pretreatment unit 172 may convert the user's utterance information received by the reception unit 171 into text. In this embodiment, the pretreatment unit 172 may include an auto speech recognition (ASR) unit (not illustrated) and an ASR database (not illustrated) in which an acoustic model and a language model are stored. Here, the acoustic model may include vocalization-related information, and the language model may include unit phoneme information and information of combinations of the unit phoneme information. The ASR unit may convert the user's utterance information into text, by using the vocalization-related information and the information on the unit phoneme information.

The analysis unit 173 may select an utterance intention that corresponds to the utterance information that has been converted into text by the pretreatment unit 172 according to the predefined rule.

The analysis unit 173 may retrieve whether the personalized statistical information DB 174 for the user has been established, and when the personalized statistical information DB 174 for the user has been established, the analysis unit 173 may retrieve, from the personalized statistical information DB 174, past reaction information of the user corresponding to at least one utterance intention that was selected corresponding to the user's utterance information, and select an utterance intention that has the highest proportion of positive reactions to negative reactions in the past reaction information.

When the user's past reaction information corresponding to at least one utterance intention that was selected corresponding to the user's utterance information is not retrieved from the personalized statistical information DB 174, the analysis unit 173 may retrieve, from the common statistical information DB 175 for the user and other users, past reaction information of the other users corresponding to at least one utterance intention that was selected corresponding to the utterance information, and select an utterance intention that has the highest proportion of positive reactions to negative reactions in the past reaction information of the other users.

When the other users' past reaction information corresponding to at least one utterance intention that was selected corresponding to the utterance information is not retrieved from the common statistical information DB 175, the analysis unit 173 may select an utterance intention having the highest probability from among a predetermined number of utterance intentions of which probabilities have been calculated, by using a deep neural network which is pre-trained to calculate probabilities of a predetermined number of utterance intentions that correspond to utterance information.

From the aforementioned details, when the analysis unit 173 receives the user's utterance information, the analysis unit 173 may retrieve whether the personalized statistical information DB 174 for the user has been established, and select the utterance intention from the personalized statistical information DB 174. When past reaction information is not retrieved from the personalized statistical information DB 174, the analysis unit 173 may select an utterance intention from the common statistical information DB 175. When past reaction information is not retrieved from the common statistical information DB 175, the analysis unit 173 may select an utterance intention by using the pre-trained deep neural network.

When the analysis unit 173 completes a selection of an utterance intention, the switch unit 176 may switch the operation of the display apparatus 100 on the basis of the selected utterance intention. Here, the switch unit 176 may generate and provide, before switching the operation of the display apparatus 100, notification information notifying the user that the operation of the display apparatus 100 will be switched on the basis of the utterance intention having the highest probability. The notification information may be, for example, "Do you want to change to channel XXX?," and this notification information may be provided, by control of the control unit 190, to the display unit 140 or the audio output unit 152, or may be provided to the user terminal 200 through the external device interface unit 131.

The collection unit 177 may collect the user's reaction information that corresponds to the switched operation of the display unit 100. The collection unit 177 may collect the user's reaction information from image information of the user, that is, a gesture of the user, which is acquired by means of a camera included in the sensing unit 160, within a predetermined time (for example, 3 seconds) after the operation of the display apparatus 100 is switched on the basis of the selected utterance intention. In addition, the collection unit 177 may collect the user's reaction information from audio information of the user which is acquired by means of the audio input unit 151, that is, a microphone, within a predetermined time after the operation of the display apparatus 100 is switched on the basis of the selected utterance intention. Here, the user's reaction information may include positive reaction information, negative reaction information, and neutral reaction information. The positive reaction information is a voice and/or a gesture expressed by the user when the operation of the display apparatus 100 switched on the basis of the selected utterance intention is satisfactory, the negative reaction information is a voice and/or a gesture expressed by the user when the operation of the display apparatus 100 switched on the basis of the selected utterance intention is unsatisfactory, and the neutral reaction information is information generated when the user does not express a voice or a gesture when the operation of the display apparatus 100 switched on the basis of the selected utterance intention is neither satisfactory nor unsatisfactory The reconstruction unit 178 may reconstruct the predefined rule by using the user's utterance information, the selected utterance intention, and the user's reaction information (at least one selected from the group of the positive reaction information, the negative reaction information, and the neutral reaction information). The reconstruction unit 178 may reconstruct the deep neural network such that as the number of negative reactions to the utterance intention selected corresponding to the user's utterance information increases, the probability that the utterance intention is selected for the utterance information decreases, and as the number of positive reactions to the utterance intention selected corresponding to the user's utterance information increases, the probability that the utterance intention is selected for the utterance information increases.

The reconstruction unit 178 may update the user's utterance information, the selected utterance intention, and the user's reaction information in the personalized statistical information DB 174 and the common statistical information DB 175 through the analysis unit 173.

When the user's reaction information corresponding to all utterance information of the user is collected, personalized information for the utterance information is accumulated in the personalized statistical information DB 174, and as a result, the utterance information may be personalized. That is, in this embodiment, as the user's reaction information is accumulated, the utterance information may be automatically personalized. When the utterance information has been personalized, the display apparatus 100 that has received the user's utterance information may switch the operation thereof on the basis of the selected utterance intention, without having to make an additional question asking the user for a selection. Further, in this embodiment, until the user's reaction information is sufficiently accumulated, the display apparatus 100 may switch the operation thereof on the basis of an utterance intention that is generally desired by users, by using the common statistical information DB 175. In this embodiment, the reconstruction unit 178 may automatically retrieve an operation that is generally desired by users from the user's utterance information, the selected utterance intention, and the user's reaction information. By doing so, the reconstruction unit 178 may gradually improve the pre-trained deep neural network.

FIG. 4 is an exemplary view for explaining information that is established in the personalized statistical information DB 174 and the common statistical information DB 175. Hereinafter, the same description as that of FIGS. 1 to 3 above will be omitted.

FIG. 4a illustrates information that is established in the personalized statistical information DB 174. The personalized statistical information DB 174 may store therein an ID of a user, an utterance ID of the user, past utterance information of the user corresponding to the utterance ID, a predetermined number of utterance intentions as a result of an intention analysis performed by the analysis unit 173 for the user's past utterance information, and the number of reactions as the user's past reaction information corresponding to the predetermined number of utterance intentions.

For example, when a user having an ID of "1" utters "MBC drama" as utterance information towards the display apparatus 100, the analysis unit 173 may retrieve the user's ID from the personalized statistical information DB 174, and retrieve whether "MBC drama" is present in the user's past utterance information. Referring to the personalized statistical information DB 174 illustrated in FIG. 4a, "MBC drama" is present in the user's past utterance information. In addition, a predetermined number of utterance intentions for "MBC drama" among the user's past utterance information, and the user's past reaction information corresponding to the predetermined number of utterance intentions are stored in the personalized statistical information DB 174. The analysis unit 173 may select, from among the predetermined number of utterance intentions for "MBC drama," an utterance intention that has the highest proportion of positive reactions to negative reactions in the past reaction information. That is, the analysis unit 173 may select "CHANGE CHANNEL."

FIG. 4b illustrates information that is established in the common statistical information DB 175. The common statistical information DB 175 may store therein a common utterance ID, past common utterance information of users corresponding to the common utterance ID, a predetermined number of utterance intentions as a result of an intention analysis performed by the analysis unit 173 for the past common utterance information of the users, and the number of reactions as the past reaction information of the users for the utterance intentions.

For example, when the user having the ID of "1" utters "SBS drama" towards the display apparatus 100, the analysis unit 173 may firstly retrieve the user's ID from the personalized statistical information DB 174, and retrieve whether "SBS drama" is present in the user's past utterance information. Because "SBS drama" is not present in the user's utterance information in the personalized statistical information DB 174 illustrated in FIG. 4a, the analysis unit 173 may then retrieve whether "SBS drama" is present in the users' past common utterance information in the common statistical information DB 175. Referring to the common statistical information DB 175 illustrated in FIG. 4b, "SBS drama" is present in the past common utterance information of the users. In addition, a predetermined number of utterance intentions corresponding to "SBS drama" among the users' past common utterance information, and the users' reaction information for each of the utterance intentions, are stored in the common statistical information DB 175. The analysis unit 173 may select, from the predetermined number of utterance intentions corresponding to "SBS drama," an utterance intention that has the highest proportion of positive reactions to negative reactions in the past reaction information. That is, the analysis unit 173 may select "SEARCH_CONTENT."

However, when past reaction information of the other users for at least one utterance intention that was selected corresponding to the user's utterance information is not retrieved from the personalized statistical information DB 174 or the common statistical information DB 175, the analysis unit 173 may select an utterance intention having the highest probability from among a predetermined number of utterance intentions of which probabilities have been calculated, by using a deep neural network which is pre-trained to calculate probabilities of a predetermined number of utterance intentions that correspond to utterance information.

Figure 5:
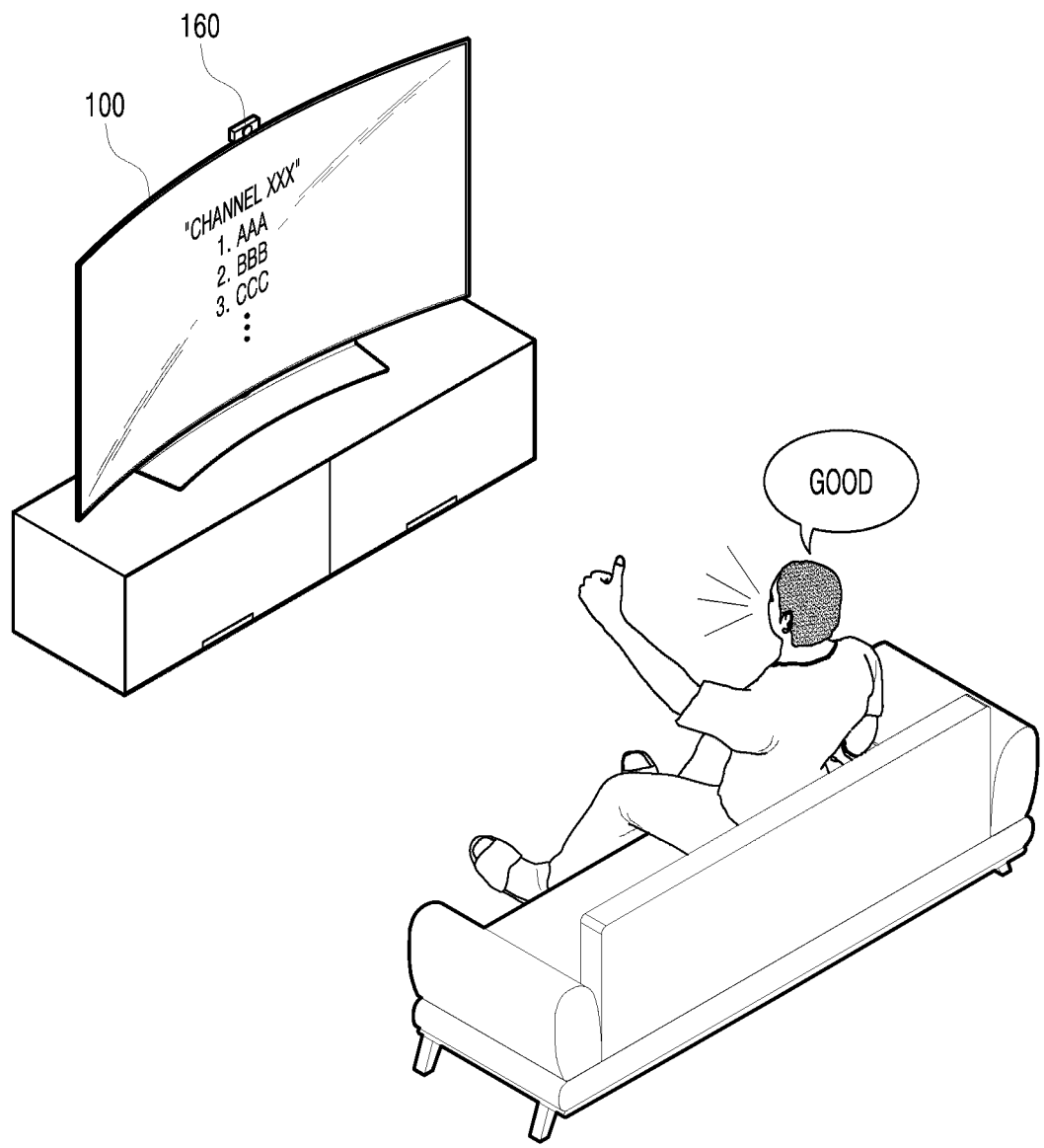
FIG. 5 is an exemplary view for explaining collection of reaction information of a user of FIG. 3.

FIG. 5 is an exemplary view for explaining collection of the user's reaction information of FIG. 3. Hereinafter, the same description as that of FIGS. 1 to 4 above will be omitted.

Referring to FIG. 5, the collection unit 177 may collect the user's reaction information from image information of the user, that is, a gesture of the user, which is acquired by means of a camera included in the sensing unit 160, or the collection unit 177 may collect the user's reaction information from audio information of the user which is acquired by means of the audio input unit 151, that is, a microphone, within a predetermined time (for example, 3 seconds) after the operation of the display apparatus 100 is switched on the basis of the selected utterance intention. FIG. 5 illustrates an exemplary embodiment of collecting positive reaction information expressed as a voice and a gesture by a user who is satisfied with the operation of the display apparatus 100 switched on the basis of the selected utterance intention.

In addition, the user's reaction information may further include negative reaction information which is a voice and/or a gesture expressed by the user when the operation of the display apparatus 100 switched on the basis of the selected utterance intention is unsatisfactory, and neutral reaction information which is information generated when the user does not express a voice or gesture when the operation of the display apparatus 100 switched on the basis of the selected utterance intention is neither satisfactory nor unsatisfactory.

FIG. 6 is a flow chart illustrating a method for operating a display apparatus according to an exemplary embodiment of the present disclosure. The same description as that of FIGS. 1 to 5 above will be omitted.

Referring to FIG. 6, in S610, the display apparatus 100 may receive utterance information of the user who is watching the display apparatus 100.

In S620, the display apparatus 100 may select an utterance intention that corresponds to the user's utterance information according to the predefined rule.

Here, the display apparatus 100 may retrieve whether a personalized statistical information database for the user has been established, and when a personalized statistical information database for the user has been established, the display apparatus 100 may retrieve, from the personalized statistical information database, the user's past reaction information corresponding to at least one utterance intention that was selected corresponding to the user's utterance information, and select an utterance intention that has the highest proportion of positive reactions to negative reactions in the past reaction information. When the user's past reaction information corresponding to at least one utterance intention that was selected corresponding to the user's utterance information is not retrieved from the personalized statistical information database, the display apparatus 100 may retrieve, from a common statistical information database for the user and other users, past reaction information of the other users corresponding to at least one utterance intention that was selected corresponding to the utterance information, and select an utterance intention that has the highest proportion of positive reactions to negative reactions in the past reaction information of the other users. Meanwhile, when past reaction information of the other users corresponding to at least one utterance intention that was selected corresponding to the utterance information is not retrieved from the common statistical information database, the display apparatus 100 may select an utterance intention having the highest probability from among a predetermined number of utterance intentions of which probabilities have been calculated, by using a deep neural network which is pre-trained to calculate probabilities of a predetermined number of utterance intentions that correspond to utterance information.

In S630, the operation of the display apparatus 100 may be switched on the basis of the selected utterance intention.

In S640, the display apparatus 100 may collect the user's reaction information that corresponds to the switched operation of the display apparatus 100.

Here, the display apparatus 100 may collect the user's reaction information from image information of the user, that is, a gesture of the user, which is acquired by means of a camera, and/or from audio information of the user which is acquired by means a microphone, within a predetermined time (for example, 3 seconds) after the operation of the display apparatus 100 is switched on the basis of the selected utterance intention.

In S650, the display apparatus 100 may reconstruct the deep neural network by using the user's utterance information, the selected utterance intention, and the user's reaction information.

Here, the display apparatus 100 may reconstruct the deep neural network such that as the number of negative reactions to the utterance intention selected corresponding to the user's utterance information increases, the probability that the utterance intention is selected for the utterance information decreases, and as the number of positive reactions to the utterance intention selected corresponding to the user's utterance information increases, the probability that the utterance intention is selected for the utterance information increases. The display apparatus 100 may update the user's utterance information, the selected utterance intention, and the user's reaction information in the personalized statistical information DB and the common statistical information DB.

The example embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of program code include both machine code, such as produced by a compiler, and higher level code that may be executed by the computer using an interpreter.

As used in the present application (especially in the appended claims), the terms 'a/an' and 'the' include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example", etc.) used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various alterations, substitutions, and modifications may be made within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A method for operating a display apparatus, comprising the acts of:
receiving utterance information of a user who is watching the display apparatus;
selecting an utterance intention that corresponds to the user's utterance information according to a predefined rule;
switching operation of the display apparatus based on the selected utterance intention;
collecting reaction information of the user that corresponds to the switched operation of the display apparatus; and
reconstructing the predefined rule by using the user's utterance information, the selected utterance intention, and the user's reaction information,
wherein the act of selecting the utterance intention that corresponds to the user's utterance information according to the predefined rule comprises:
retrieving whether a personalized statistical information database for the user has been established;
when the personalized statistical information database for the user has been established, retrieving, from the personalized statistical information database, past reaction information of the user corresponding to at least one utterance intention that was selected corresponding to the user's utterance information, and selecting an utterance intention that has a highest proportion of positive reactions to negative reactions in the past reaction information; and when the user's past reaction information corresponding to the at least one utterance intention that was selected corresponding to the user's utterance information is not retrieved from the personalized statistical information database, retrieving, from a common statistical information database for the user and other users, past reaction information of the other users corresponding to the at least one utterance intention that was selected corresponding to the user's utterance information, and selecting an utterance intention that has a highest proportion of positive reactions to negative reactions in the past reaction information of the other users.

2. The method for operating a display apparatus according to claim 1, wherein the act of selecting the utterance intention that corresponds to the user's utterance information according to a to the predefined rule further comprises:

when the other users' past reaction information corresponding to the at least one utterance intention that was selected corresponding to the user's utterance information is not retrieved from the common statistical information database, selecting an utterance intention having a highest probability from among a predetermined number of utterance intentions of which probabilities have been calculated, by using a deep neural network which is pre-trained to calculate the probabilities of the predetermined number of utterance intentions that correspond to the utterance information.

3. The method for operating a display apparatus according to claim 2, wherein the act of reconstructing comprises:

reconstructing the deep neural network so that as a number of negative reactions to the utterance intention selected corresponding to the user's utterance information increases, a probability that the utterance intention is selected for the utterance information decreases, and as a number of positive reactions to the utterance intention selected corresponding to the user's utterance information increases, the probability that the utterance intention is selected for the utterance information increases.

4. The method for operating a display apparatus according to claim 1, wherein the act of collecting reaction information of the user comprises:

collecting the user's reaction information from image information of the user which is obtained by using a camera within a predetermined time after the operation of the display apparatus is switched based on the selected utterance intention.

5. The method for operating a display apparatus according to claim 1, wherein the act of collecting reaction information of the user comprises:

collecting the user's reaction information from audio information of the user which is obtained by using a microphone within a predetermined time after the operation of the display apparatus is switched based on the selected utterance intention.

6. The method for operating a display apparatus according to claim 1, further comprising:

after the act of receiving the utterance information of the user, converting the utterance information to text.

7. The method for operating a display apparatus according to claim 1, further comprising:

before the act of switching the operation of the display apparatus based on the selected utterance intention, generating and providing notification information notifying the user that the operation of the display apparatus will be switched based on the selected utterance intention.

8. A non-transitory computer readable storage medium, wherein, a computer program is stored in the computer readable storage medium, and the computer program, when executed by a processor, causes the processor to perform the method of claim 1.

9. A display apparatus, comprising:

a reception unit configured to receive utterance information of a user who is watching the display apparatus;

an analysis unit configured to select an utterance intention that corresponds to the user's utterance information according to a predefined rule;

a switch unit configured to switch operation of the display apparatus based on the selected utterance intention;

a collection unit configured to collect reaction information of the user that corresponds to the switched operation of the display apparatus; and a reconstruction unit configured to reconstruct the predefined rule by using the user's utterance information, the selected utterance intention, and the user's reaction information, wherein the analysis unit:

retrieves whether a personalized statistical information database for the user has been established;

when the personalized statistical information database for the user has been established, retrieves, from the personalized statistical information database, past reaction information of the user corresponding to at least one utterance intention that was selected corresponding to the user's utterance information, and selects an utterance intention that has a highest proportion of positive reactions to negative reactions in the past reaction information; and when the user's past reaction information corresponding to the at least one utterance intention that was selected corresponding to the user's utterance information is not retrieved from the personalized statistical information database, retrieves, from a common statistical information database for the user and other users, past reaction information of the other users corresponding to the at least one utterance intention that was selected corresponding to the user's utterance information, and selects an utterance intention that has a highest proportion of positive reactions to negative reactions in the past reaction information of the other users.

10. The display apparatus according to claim 9, wherein when the other users' past reaction information corresponding to the at least one utterance intention that was selected corresponding to the user's utterance information is not retrieved from the common statistical information database, the analysis unit selects an utterance intention having a highest probability from among a predetermined number of utterance intentions of which probabilities have been calculated, by using a deep neural network which is pre-trained to calculate the probabilities of the predetermined number of utterance intentions that correspond to the utterance information.

11. The display apparatus according to claim 10, wherein the reconstruction unit reconstructs the deep neural network so that as a number of negative reactions to the utterance intention selected corresponding to the user's utterance information increases, a probability that the utterance intention is selected for the utterance information decreases, and as a number of positive reactions to the utterance intention selected corresponding to the user's utterance information increases, the probability that the utterance intention is selected for the utterance information increases.

12. The display apparatus according to claim 9, wherein the collection unit collects the user's reaction information from image information of the user which is obtained by using a camera within a predetermined time after the operation of the display apparatus is switched based on the selected utterance intention.

13. The display apparatus according to claim 9, wherein the collection unit collects the user's reaction information from audio information of the user which is obtained by using a microphone within a predetermined time after the operation of the display apparatus is switched based on the selected utterance intention.

14. The display apparatus according to claim 9, further comprising:
a pretreatment unit which, after the user's utterance information is received, converts the user's utterance information to a text.

15. The display apparatus according to claim 9, wherein before the operation of the display apparatus is switched based on the selected utterance intention, the switch unit generates and provides notification information notifying the user that the operation of the display apparatus will be switched based on the selected utterance intention.

16. A non-transitory computer readable storage medium, wherein, a computer program is stored in the computer readable storage medium, and the computer program, when executed by a processor, causes the processor to perform the method of claim 4.

17. A non-transitory computer readable storage medium, wherein, a computer program is stored in the computer readable storage medium, and the computer program, when executed by a processor, causes the processor to perform the method of claim 2.

18. A non-transitory computer readable storage medium, wherein, a computer program is stored in the computer readable storage medium, and the computer program, when executed by a processor, causes the processor to perform the method of claim 3.

* * * * *